(12) United States Patent
Mayer et al.

(10) Patent No.: US 11,611,225 B2
(45) Date of Patent: Mar. 21, 2023

(54) TRANSMISSION DEVICE, DATA RECORDING DEVICE, SYSTEM COMPRISING TEMPERATURE CONTROL DEVICE AND DATA RECORDING DEVICE, BATTERY SYSTEM AND METHOD FOR TRANSMITTING STATUS DATA

(71) Applicant: LION Smart GmbH, Garching (DE)

(72) Inventors: Tobias Mayer, Munich (DE); Daniel Ostermeier, Munich (DE); Christian Behlen, Munich (DE); Daniel Quinger, Herrsching (DE); Michael Zettel, Freising (DE)

(73) Assignee: Lion Smart GmbH, Garching (DE)

( * ) Notice: Subject to any disclaimer, the term of this patent is extended or adjusted under 35 U.S.C. 154(b) by 92 days.

(21) Appl. No.: 16/633,972

(22) PCT Filed: Jul. 24, 2018

(86) PCT No.: PCT/EP2018/069978
§ 371 (c)(1),
(2) Date: Jan. 24, 2020

(87) PCT Pub. No.: WO2019/020596
PCT Pub. Date: Jan. 31, 2019

(65) Prior Publication Data
US 2020/0220233 A1 Jul. 9, 2020

(30) Foreign Application Priority Data

Jul. 27, 2017 (DE) ..................... 10 2017 116 983.0

(51) Int. Cl.
*H02J 7/00* (2006.01)
*B60L 50/64* (2019.01)
(Continued)

(52) U.S. Cl.
CPC ............ *H02J 7/0047* (2013.01); *B60L 50/64* (2019.02); *H01M 10/486* (2013.01);
(Continued)

(58) Field of Classification Search
CPC .... B60L 1/02; B60L 3/12; B60L 50/64; B60L 58/10; B60L 58/26; B60L 58/27;
(Continued)

(56) References Cited

U.S. PATENT DOCUMENTS

| 8,492,642 B2 | 7/2013 | Kim | |
|---|---|---|---|
| 2013/0052490 A1* | 2/2013 | TenHouten | ........ B60H 1/00278 |
| | | | 429/50 |

(Continued)

FOREIGN PATENT DOCUMENTS

| JP | H 4-312035 A | 11/1992 |
|---|---|---|
| JP | 2001-294102 A | 10/2001 |

(Continued)

OTHER PUBLICATIONS

International Search Report dated Sep. 4, 2018 from corresponding International Patent Application No. PCT/EP2018/069978, with English translation, 5 pages.

(Continued)

*Primary Examiner* — Adam A Arciero
(74) *Attorney, Agent, or Firm* — Ruggiero McAllister & McMahon LLC (57) ABSTRACT

A detecting device detects at least one battery characteristic of at least one battery cell of a battery plane of a battery stack. A carrier has at least one electrical lead element and at least one contact element having a contact section for contacting a mating contact section of the at least one battery cell. The contact element has a sensor section for detecting the at least one battery characteristic of the battery cell. The sensor section is connected by data-communicating to the at (Continued)

least one line element for forwarding the at least one detected battery characteristic. Furthermore, the invention relates to a battery stack having at least one battery plane with at least one battery cell and a detection device.

16 Claims, 2 Drawing Sheets

(51) Int. Cl.
*H01M 10/613* (2014.01)
*H01M 10/625* (2014.01)
*H01M 10/633* (2014.01)
*H01M 10/48* (2006.01)
*B60L 58/27* (2019.01)
*B60L 58/26* (2019.01)

(52) U.S. Cl.
CPC ....... *H01M 10/488* (2013.01); *H01M 10/613* (2015.04); *H01M 10/625* (2015.04); *H01M 10/633* (2015.04); *B60L 58/26* (2019.02); *B60L 58/27* (2019.02); *H01M 2220/20* (2013.01)

(58) Field of Classification Search
CPC ............. H01M 10/4257; H01M 10/48; H01M 10/486; H01M 10/488; H01M 10/613; H01M 10/625; H01M 10/633; H01M 2220/20; H02J 7/0047
See application file for complete search history.

(56) References Cited

U.S. PATENT DOCUMENTS

| | | |
|---|---|---|
| 2014/0046524 A1 | 2/2014 | Brown |
| 2016/0141734 A1 | 5/2016 | Bui Van et al. |
| 2017/0106724 A1 | 4/2017 | Parras et al. |
| 2017/0125860 A1* | 5/2017 | Chatroux ............ H01M 10/617 |

FOREIGN PATENT DOCUMENTS

| | | |
|---|---|---|
| JP | 2006-93155 A | 4/2007 |
| JP | 2016-529651 A | 9/2016 |
| WO | 02/082692 A1 | 10/2002 |

OTHER PUBLICATIONS

Written Opinion dated Sep. 4, 2018 from corresponding International Patent Application No. PCT/EP2018/069978, 5 pages.
German Examination Report dated Apr. 26, 2018 from corresponding German patent application No. DE 10 2017 116 983.0, 14 pages.
Japanese Notice of Reasons for Refusal dated Jun. 21, 2022 from corresponding Japanese patent application No. 2020-502981, 8 pages.

* cited by examiner

TRANSMISSION DEVICE, DATA RECORDING DEVICE, SYSTEM COMPRISING TEMPERATURE CONTROL DEVICE AND DATA RECORDING DEVICE, BATTERY SYSTEM AND METHOD FOR TRANSMITTING STATUS DATA

CROSS-REFERENCE TO RELATED APPLICATIONS

This application is a national stage application, filed under 35 U.S.C. § 371, of International Patent Application No. PCT/EP2018/069978, filed on Jul. 28, 2018, which claims priority to German Patent Application 102017116983.0, filed on Jul. 24, 2017, the entire contents of each of which is incorporated by reference herein in its entirety.

BACKGROUND

1. Field of the Disclosure

The present invention relates to a transmission device for transmitting status data for a battery system having at least one battery cell and a temperature control device for temperature control of the at least one battery cell with a temperature control fluid conducted at least in sections in a temperature control fluid line, the transmission device having a sensor interface for data-communicating connection with a sensor device for determining status data of the at least one battery cell and a control interface for data-communicating connection in a control device for processing the status data. Furthermore, the invention relates to a data recording device for recording status data of a battery system, the battery system having at least one battery cell and a temperature control device for controlling the temperature of the at least one battery cell with a temperature control fluid conducted at least in sections in a temperature control fluid line, the data recording device having a sensor device with at least one sensor unit for determining the status data of the at least one battery cell, a control device for processing the status data and a transmission device for transmitting the status data. Furthermore, the invention relates to a system comprising a temperature control device and a data recording device for a battery system, the battery system comprising at least one battery cell, the temperature control device comprising a temperature control fluid conducted at least in sections in a temperature control fluid line for temperature control of the at least one battery cell, the data recording device comprising a sensor device for determining status data of the at least one battery cell, a control device for processing the status data and a transmission device for transmitting the status data. In further aspects, the invention relates to a battery system comprising at least one battery cell and a system comprising a temperature control device and a data recording device for a battery system, and a method for transmitting status data of a battery cell in a battery system.

2. Description of Related Art

Battery systems as electrical energy storage devices are widely used in modern technology, for example in electric vehicles. Possible forms of such energy storage systems are, for example, lithium-ion batteries. In order to increase the performance of such battery systems, it is also known, for example, that several individual battery cells are electrically connected in parallel at one battery level, and that several such battery levels are also electrically connected in series. In order to ensure the operational safety of such battery systems, it is known that status data of the individual battery cells are detected by sensor devices and detected in, mostly centrally available, control devices and evaluated in these. Accurate information about both the overall condition of the battery system and the condition of the individual battery cells can be provided in this way.

In order to be able to evaluate the status data determined by the sensor devices on the battery cells in the control device, these status data must be transferred from the sensor devices to the control device. For this transmission of status data, mostly wired transmission devices are used. For this purpose, the control device and the sensor device are connected to each other by means of cables and/or conductors, which can be used to exchange data between the sensor device and the control device. This data transmission is preferably performed via electrical impulses through the cables or wires.

The use of cables or wires as transmission devices leads to several disadvantages. For example, the cables or wires of these transmission devices require their own installation space, which means that a battery system of this type is less compact and/or boundary conditions have to be taken into account in the planning and construction of the battery system which, for example, prevent or at least complicate the optimal configuration of the battery system. Furthermore, this wired transmission of status data can generate electromagnetic impurities, which can affect the operation of the battery system. On the other hand, electromagnetic contamination of the battery system itself can also be coupled into the cables, which can interfere with the transmission of status data. The plugs or plug connections required to connect the cables and/or wires can also have a negative effect on signal quality and in particular on the reliability of a state-of-the-art transmission device. These negative effects are usually all the more serious the more such plugs or plug connections are used.

BRIEF SUMMARY

It is therefore the object of the present invention to remedy at least in part the disadvantages described above. In particular, the object of the present invention is to provide, in a cost-effective and simple manner, a transmission device, a data recording device, a system comprising a temperature control device and a data recording device, a battery system and a method for transmitting status data, by means of which a transmission of status data within a battery system can be simplified, in particular an additional wiring can be avoided and the transmission of the status data can be performed without electromagnetic interference or only with minimal electromagnetic interference.

The preceding object is solved by a transmission device for transmitting status data with the features of claim 1, by a data recording device with the features of claim 6, by a system comprising a temperature control device and a data recording device with the features of claim 12, by a battery system with the features of claim 15 and by a method for transmitting status data of a battery cell with the features of claim 16. Further features and details of the invention result from the dependent claims, the description and the drawings. Features and details which are described in connection with the transfer device according to the invention also apply, of course, in connection with the data recording device according to the invention, with the system according to the invention consisting of a temperature control device and a data recording device, with a battery system according to the invention as well as with a method according to the invention for transferring status data of a battery cell and vice versa in each case, so that mutual reference is or can always be made to the individual aspects of the invention with regard to disclosure.

According to a first aspect of the invention, the object is solved by a transmission device for transmitting status data for a battery system having at least one battery cell and a temperature control device for temperature control of the at least one battery cell with a temperature control fluid conducted at least in sections in a temperature control fluid line, the transmission device having a sensor interface for data-communicating connection with a sensor device for determining status data of the at least one battery cell and a control interface for data-communicating connection with a control device for processing the status data. A transmission device, according to the invention, is characterized in that the sensor interface comprises a first communication unit for transmitting light signals into the temperature control fluid and a first arrangement section for arranging the first communication unit in the temperature control fluid line, and the control interface comprises a second communication unit for receiving light signals from the temperature control fluid and a second arrangement section for arranging the second communication unit in the temperature control fluid line, wherein, in the arranged state, light signals can be emitted into the temperature control fluid by the first communication unit of the sensor interface for transmitting the status data and can be received from the temperature control fluid by the second communication unit of the control interface.

A transmission device, according to the invention, is intended for use in a battery system. A battery system which can be used in particular in a vehicle has at least one battery cell, whereby such a battery system usually has several battery cells, often connected in parallel at one battery level. Battery systems may also provide for several such battery levels to be electrically connected in series in order to further increase the performance of the battery system. The battery system also has a temperature control device which can be used to control the temperature of at least one battery cell. Temperature control in the sense of the invention means in particular a controlled change of a temperature of the battery cell by the temperature control device, both heating and cooling. This prevents subcooling and overheating of the battery cell and thus of the entire battery system. In addition, the temperature control device has in particular a temperature control fluid line in which a temperature control fluid is conducted. The temperature control fluid can be present as a gas, a liquid and/or in a mixed state. The temperature control fluid is preferably circulated in the temperature control device and thus flows in the temperature control fluid line, whereby thermal energy is removed from the battery cell in this way. Furthermore, a sensor device is provided at or at least in the vicinity of the battery cell by means of which status data, for example a temperature, an electrical voltage, an electrical current or the like, of the battery cell can be determined. A control device, often centrally available, is provided for the evaluation or processing of these status data. Such processing can be, for example, a pure recording of the status data, but also, for example, a comparison of the status data with reference values and, if necessary, the execution of corresponding control processes for the battery system.

As described above, the sensor device is preferably located in the vicinity of the battery cell, whereas the control device is usually located centrally in the battery system. In other words, the control device and the sensor devices in the battery system are often spaced apart. This distance of the sensor device from the control device can be bridged by a transfer device in accordance with the invention and, in particular, the status data determined by the sensor device can be transferred from the sensor device to the control device for processing in the control device. For this purpose, the transmission device has a sensor interface, which preferably, like the sensor device, is also located in the area and/or on the battery cell. The sensor interface can be connected to the sensor device to communicate data, in other words, the status data can be transferred from the sensor device to the sensor interface. Similarly, the control interface of the transmission device is preferably located close to the control device of the battery system, for example also at a central position within the battery system. Here, too, a data-communicating connection can be established between the control interface and the control device so that status data present in the control interface can be transmitted to the control device. In particular, the sensor interface of the transmission device and the control interface of the transmission device are spaced apart in the battery system to provide the above locations near the sensor device and the control device, respectively.

According to the invention, the sensor interface is provided with a first communication unit for transmitting light signals into the temperature control fluid line. The control interface further comprises a second communication unit adapted to receive light signals from the temperature control fluid. In this way it can be provided that although the sensor interface and the communication interface are spaced apart, status data can still be transmitted between these two interfaces. For this purpose, both interfaces have respective arrangement sections through which the first communication unit of the sensor interface and the second communication unit of the control interface can be arranged in the temperature control fluid line. In other words, in the arranged state at least the communication units of the sensor interface and the communication interface are located at least in sections inside the temperature control fluid line and are surrounded by temperature control fluid during operation of the battery system. For the transmission of status data, light signals can be transmitted from the first communication unit of the sensor interface to the temperature control fluid in the arranged state. The temperature control fluid can preferably be transparent or at least partially transparent to the light signals. The light signals are transmitted in the temperature control fluid line, especially in the temperature control fluid, and finally received from the temperature control fluid by the second communication unit of the control interface. In other words, the temperature control fluid line, in particular the temperature control fluid itself, is used to transmit the light signals between the first communication unit of the sensor interface and the second communication unit of the control interface. In particular, the light signals can travel directly from one communication unit to another, i.e. a path that runs exclusively in the temperature control fluid and is usually straight, or alternatively or additionally via an indirect path that, in contrast to the direct path, has one or more reflections of the light signals on the inner walls of the temperature control line.

In other words, the status data are transmitted in such a way that the status data are determined by the sensor device at the battery cell, are then transmitted in a data-communicating manner to the sensor interface, are passed into the temperature control fluid as light signals by the first communication unit of the sensor interface, are passed on by the temperature control fluid and are detected again from the temperature control fluid by the second communication unit of the control interface. The status data received from the second communication unit of the control interface are then transmitted to and processed by the control device via the data communicating connection of the control interface with the control device.

By using the temperature control line or the temperature control fluid as carrier for the light signals, the presence of wires and/or cables responsible for transmitting the status data can be dispensed with. A space that would otherwise be used for these cables can be saved in this way.

A more compact overall configuration of a battery system with such a transmission device can thus be made possible. Furthermore, the transmission of status data by means of light signals in the temperature control fluid can prevent the generation of electromagnetic interference or an impairment of the data transmission by external electromagnetic interference signals and/or contamination. All in all, a transmission device based on an invention can improve the transmission of status data of a battery cell within a battery system.

A transmission device according to the invention may preferably be further developed by the fact that the light signals are phase-synchronous or at least substantially phase-synchronous and monochromatic or at least substantially monochromatic, in particular that the light signals are configured from phase-synchronous and monochromatic laser light. By using a phase-synchronous and monochromatic light signal, in particular a light signal from laser light, the signal quality of the light signal can be significantly improved. Incorrect transmission of status data due to insufficient signal quality of the light signal can thus be avoided or at least significantly restricted. Phase-synchronous light is characterized by the fact that the individual light waves of a light source, i.e. a communication unit, are in a fixed phase relationship to each other, in other words have a high degree of coherence and thus have no or only a small difference in transit time or path length. Monochromatic light has only a single wavelength or at least a very narrow wavelength spectrum. Laser light makes these properties particularly easy to provide. Wavelengths of the laser light used can lie in a transmission device according to the invention, preferably in the infrared, UV range or in visible light.

It may be particularly preferred in the case of a transmission device according to the invention that, in order to provide a bidirectional transmission, the first communication unit is configured to receive light signals from the temperature control fluid and the second communication unit is configured to transmit light signals into the temperature control fluid. Bidirectional in the sense of the invention means in particular that data can be transferred both from the sensor interface to the control interface and from the control interface to the sensor interface. In this way, for example, it is also possible for the control device to control the sensor device. Enabling such bidirectional transmission also avoids the need to use an additional transmission device for a data communicating connection from the control device to the sensor device. This enables a further increase in the compact configuration of a battery system with a transmission device according to the invention.

A transmission device according to the invention may also be configured in such a way that the transmission device comprises an intermediate amplifier unit with at least one third communication unit for transmitting and receiving light signals into the intermediate amplifier unit and from the temperature control fluid and a third arrangement section for arranging the third communication unit in the temperature control fluid line, wherein in the arranged status light signals of the first communication unit and/or of the second communication unit can be received from the temperature control fluid line or the temperature control fluid by the at least one third communication unit of the intermediate amplifier unit and can be transmitted to the second communication unit and/or first communication unit into the temperature control fluid line or the temperature control fluid. If status data is transmitted as light signals in the temperature control line or in the temperature control fluid of the temperature control device of the battery system, the light signals may be attenuated. This can lead to a reduction in signal strength, which can become more pronounced the further one moves away from the transmitting communication unit of the respective interface. This problem can be solved or at least significantly reduced by the presence of an intermediate amplifier unit. The intermediate amplifier unit has at least one third communication unit which is configured both for transmitting and receiving light signals into and out of the temperature control fluid. In the third communication unit, additionally or alternatively also in another suitable component of the intermediate amplifier unit, the received light signal can be amplified to increase the signal strength before it is transmitted again. In addition, the intermediate amplifier unit also has a third arrangement section for placement inside the temperature control fluid line. In this way it can be provided that the intermediate amplifier unit, in particular the third communication unit of the intermediate amplifier unit, is also arranged inside the temperature control fluid line and surrounded by temperature control fluid. Such an intermediate amplifier unit can preferably be arranged at a position in the temperature control line in which a light signal emitted by the sensor interface or control interface can still be safely received. This allows the intermediate amplifier unit to pick up this signal from the respective interface and send it back to the other interface. In addition to monodirectional data transmission, bidirectional data transmission is also conceivable, so that the intermediate amplifier unit can also be used to provide bidirectional communication between the control interface and the sensor interface. It is also possible to use several intermediate amplifier units arranged one after the other in the temperature control line. In this case, the data is also transmitted from one intermediate amplifier unit to the next, so that the distance between the control interface and the sensor interface can be further increased. Preferred positions of an arrangement of the intermediate amplifier unit can be, for example, at bends of the temperature control wires of the battery system temperature control device and/or at regular intervals for amplifying the light signals. Overall, such intermediate amplifier units can thus provide a distance between the control interface and the sensor interface of the transmission device that is substantially limited only by the number of intermediate amplifier units. A particularly flexible configuration of a transmission device according to the invention, especially with regard to the arrangement of the control interface and the sensor interface, can thus be provided.

Furthermore, in the case of a transmission device in accordance with an invention, it may be particularly preferred that the first and/or the second and/or the third communication unit have an LED element for transmitting light signals and/or a photosensor element for receiving light signals. LED elements and/or photosensor elements represent preferred forms of configuration for the communication units, whereby, if technically sensible and/or possible, further configuration variants are also possible.

LED elements and photosensor elements are particularly simple elements for generating and receiving light signals in fluids. LED elements are semiconductor components that are stimulated to emit light when a voltage is applied. They are, for example, much more energy-efficient than incandescent bulbs or fluorescent elements and can often be operated at low voltages of less than 10V. In addition, special LED elements can also be configured to emit laser light. Photosensor elements usually have an optically active area that can be stimulated when light signals impinge. The detection of light signals from the temperature control fluid line or the temperature control fluid can thus be made particularly easy. Both elements are electrically and electronically simple and, in particular, require little maintenance, thus enabling a particularly long service life of a transmission device according to the invention.

In accordance with a second aspect of the invention, the object is solved by a data recording device for recording status data of a battery system, the battery system having at least one battery cell and a temperature control device for temperature control of the at least one battery cell with a temperature control fluid conducted at least in sections in a temperature control fluid line, the data recording device having a sensor device having at least one sensor unit for determining the status data of the at least one battery cell, a control device for processing the status data and a transmission device for transmitting the status data. A data recording device according to the invention is characterized in that the transfer device is configured according to the first aspect of the invention. All the advantages which have been described in detail in relation to a transfer device according to the first aspect of the invention can thus also be provided by a data recording device according to the second aspect of the invention having such a transfer device according to the first aspect of the invention.

A data recording device according to the invention may further be characterized in that the control device comprises an evaluation unit for processing the status data, at least the evaluation unit and the second communication unit being arranged on a common board. The control interface, in particular the second communication unit of the control interface, is configured for data-communicating connection to the control unit. This can be particularly easily provided when the control device and the second communication unit are located on a common board. A particularly compact configuration of a data recording device according to the invention and thus of the entire battery system can thus be provided. The data-communicating connection between the second communication unit and the control device can already be provided in this configuration, for example, by simple conductor tracks on the circuit board. In addition, this makes it particularly easy to control the temperature of the control device at least partially by means of the temperature control line of the temperature control device. This can be provided in particular by the fact that the second communication unit is arranged at least in sections inside the temperature control line. This means that the circuit board is arranged on the temperature control line and can even extend into the inside of the temperature control line in some cases. By the simultaneous arrangement of the control device on the same board, this control device is automatically arranged close to the temperature control line, whereby a temperature control of the control device can be provided particularly simply. In summary, this provision of a temperature control of the control device and the possibility of a particularly simple data-communicating connection between the control device and the second communication unit form the advantages of this configuration of a data recording device according to the invention.

Furthermore, a data recording device according to the invention may be configured such that the at least one sensor unit is configured to acquire at least one of the following status data: temperature voltage current leak This list is not exhaustive, so that further status data, as far as technically reasonable and possible, can be recorded by at least one sensor unit. The sensor unit is located at or near the battery cell to detect the status data. A comprehensive detection of the condition of the battery cell can be performed from these status data by evaluation in the control device.

In addition, a data recording device according to the invention may be configured such that the sensor device comprises two or more sensor units for recording status data from two or more battery cells, preferably each of the at least two battery cells being associated with at least one sensor unit. In this way, it can be provided that comprehensive monitoring can also be provided from multiple battery cells of the battery system. Sensor units, for example at least one each, are particularly preferred for each of the battery cells of the battery system. In this way, monitoring of all battery cells of the battery system can be provided, especially on an individual basis regarding the battery cells. A detection of a condition of the battery system, in particular an error condition, can thus be performed so precisely that a defective battery cell, in particular, can be detected preferentially.

A data recording device according to the invention may also be further developed such that, for distinguishing the battery cells, the transmission device comprises at least one first communication unit for each associated battery cell, wherein each of the first communication units is connected to the sensor unit associated with the respective battery cell via the sensor interface so as to communicate data. In this way it is possible to differentiate between the monitored battery cells by detecting the first communication unit. By recognizing which first communication unit the respective light signal was sent, an assignment to the corresponding battery cell can be made particularly simply and without large input.

Alternatively or additionally, a data recording device according to the invention may be further developed such that the first communication unit is configured to emit light signals which are frequency modulated, pulse width modulated and/or amplitude modulated to distinguish the acquired battery cells. In this way it is also possible to differentiate the monitored battery cell when using only a single first communication unit. By modulating the emitted light signal with regard to a used frequency, a used pulse width and/or a used amplitude, a distinction can be made between the respective battery cell from which the acquired status data originate with just a first communication unit. The possibility of using only a single first communication unit further simplifies the overall configuration of a data recording device according to the invention.

Alternatively or additionally, the recorded status data can also be digitized and only then transmitted as light signals in the temperature control fluid. The digital signals can contain information to distinguish the individual battery cells, for example as a head section of a data packet.

According to a third aspect of the invention, the object is solved by a system comprising a temperature control device and a data recording device for a battery system, the battery system comprising at least one battery cell, the temperature control device comprising a temperature control fluid conducted at least in sections in a temperature control fluid line for temperature control of the at least one battery cell, the data recording device comprising a sensor device for determining status data of the at least one battery cell, a control device for processing the status data and a transmission device for transmitting the status data. A system according to the invention is characterized in that the transfer device is configured according to the first aspect of the invention and/or the data recording device is configured according to the second aspect of the invention. All the advantages which have been described in detail with respect to a data transmission device in accordance with the first aspect of the invention and/or with respect to a data recording device in accordance with the second aspect of the invention can thus also be provided by a system in accordance with the third aspect of the invention having such a transmission device in accordance with the first aspect of the invention and/or such a data recording device in accordance with the second aspect of the invention.

A system in accordance with the invention can be further developed in such a way that, in order to provide a total reflection of the light signals, the temperature control fluid line has an inner wall with at least two different refractive indices, and/or that the temperature control fluid line has an inner wall, the inner wall and the temperature control fluid having two different refractive indices. Total reflection of light signals can occur at interfaces between two optically differently dense media, whereby the light signals run in the optically denser medium. With such a total reflection, the light signals are reflected without or at least without significant attenuation at the interface, whereby a range of an emitted light signal can be significantly increased in a transmission device in accordance with the invention inside the temperature control fluid line. In other words, total reflection of the light signals can occur in a system according to the invention, if, for example, the temperature control fluid line has two areas with different refractive indices transparent to the light signal, the area with the larger refractive index being arranged radially inwards and the area with the smaller refractive index radially outwards, surrounding the first area in contact. Alternatively or additionally, the interface between the temperature control fluid and the inner wall may be used to provide total reflection. For this purpose, it may be provided that the temperature control fluid, which is transparent or at least partially transparent to the light signals, has a greater refractive index than the inner wall of the temperature control fluid line surrounding the temperature control fluid, this inner wall preferably also being transparent to the light signals. All in all, both configurations make it particularly easy to provide total reflection for the light signals. In this way, a particularly good and low-loss transmission of the light signals through the temperature control line or the temperature control fluid can be provided.

Furthermore, in a system according to the invention, it may be provided that the temperature control fluid line between a first arrangement location of the first communication unit and a second arrangement location of the second communication unit is straight or at least substantially straight. In particular, bends, curves and/or creases in the temperature control fluid line can lead to a high attenuation and, in the worst case, to a blocking of a light signal in the temperature control fluid. By arranging the communication units of the sensor interface and the control interface in an area of the temperature control fluid line which is straight or at least substantially straight, a reduction in the signal strength at just such a corner, edge and/or bend can be avoided. The same applies analogously to the arrangement of an intermediate amplifier unit and in particular its third communication unit. It is therefore an overall advantage if the temperature control fluid line between two communication units is straight or at least essentially straight, irrespective of whether the communication unit belongs to a control interface, a sensor interface or an intermediate amplifier unit.

According to a fourth aspect of the invention, the object is solved by a battery system comprising at least one battery cell and a system of a temperature control device and a data recording device for a battery system. A battery system according to the invention is characterized by the fact that the system is configured according to the third aspect of the invention. A system conforming to the invention according to the third aspect of the invention comprises in particular a transmission device according to the first aspect of the invention and/or a data recording device according to the second aspect of the invention. In total, therefore, all the advantages which have been described in detail in relation to a system according to the third aspect of the invention, in relation to a transmission device according to the first aspect of the invention and/or in relation to a data recording device according to the second aspect of the invention can also be provided by a battery system according to the fourth aspect of the invention comprising such a system, such a transmission device and/or such a data recording device.

According to a fifth aspect of the invention, the object is solved by a method for transferring status data of a battery cell in a battery system according to the fourth aspect of the invention. A method in accordance with the invention is characterized in that the status data are transmitted at least in sections as light signals in the temperature control fluid. Thus, the use in a battery system according to the fourth aspect of the invention can also provide, through a method according to the fifth aspect of the invention, all the advantages which have been described in detail in relation to a battery system according to the fourth aspect of the invention. Since a battery system according to the fourth aspect of the invention comprises a data transmission device according to the first aspect of the invention, a data recording device according to the second aspect of the invention and/or a system according to the third aspect of the invention, the advantages which have been described in detail with respect to these aspects of the invention may also be provided by a method according to the fifth aspect of the invention.

DESCRIPTION OF THE DRAWINGS

Further advantages, features and details of the invention result from the following description, in which embodiments of the invention are described in detail with reference to the drawings. The features mentioned in the claims and in the description may be essential to the invention either individually or in any combination. The explanation of the embodiments describes the present invention exclusively in the context of examples. Of course, individual features of the embodiments can be freely combined with each other, if technically reasonable, without leaving the scope of the present invention. Elements with the same function and mode of action have the same reference signs in the figures. They show schematically:

DETAILED DESCRIPTION

Figure 1:
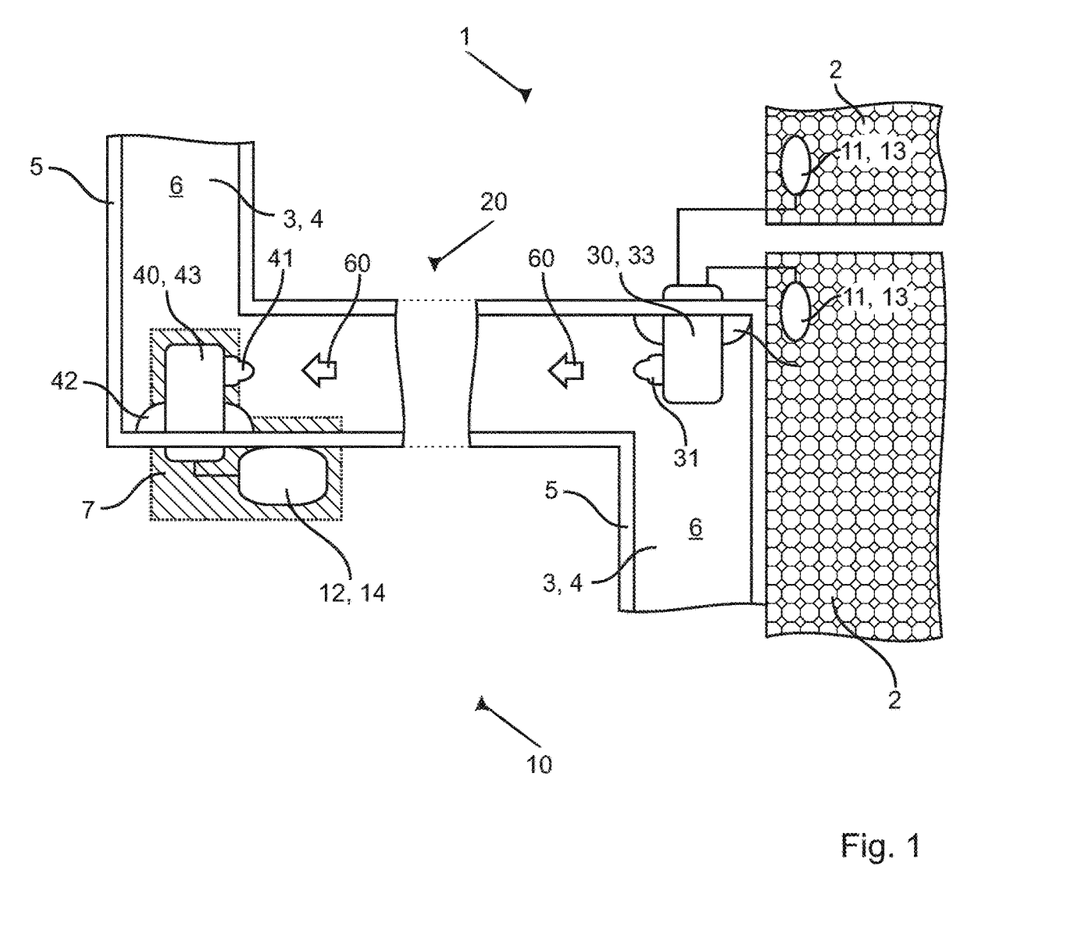
FIG. 1 a battery system according to the invention in an initial form.

FIG. 1 shows a battery system 1 according to the invention in a first embodiment. The battery system 1 has several battery cells 2, of which two battery cells 2 are shown. A sensor unit 13 of a sensor device 11 is arranged on each battery cell 2 to record status data of the respective battery cell 2, for example a temperature or electrical variables such as voltage or current. Furthermore, a temperature control device 3 of the battery system 1 is shown, in particular a temperature control fluid line 4 in which a temperature control fluid 6 is conducted. The temperature control fluid 6 conducts heat energy away from the individual battery cells 2, thus controlling the temperature of them. A battery system 1 according to the invention is also equipped in particular with a data recording device 10 according to the invention. The sensor devices 11 already described above are part of this data recording device 10. Further parts are a control device 12, which for example has an evaluation unit 14, and a transmission device 20 according to the invention. In the embodiment shown, the transmission device 20 has a control interface 40 and a sensor interface 30. The sensor interface 30 is connected to the sensor units 13 of the sensor device 11 for data communication. Analogously, the control interface 40 is connected to the evaluation unit 14 of the control device 12, communicating data. The control device 12, in particular the evaluation unit 14, and the control interface 40 are also arranged here on the same board 7, whereby on the one hand the transmission paths between the control interface 40, in particular the second communication unit 41 of the control interface 40, and the evaluation unit 14 can be minimized, and on the other hand an arrangement of the evaluation unit 14 of the control device 12 in the vicinity of the temperature control fluid line 4 is particularly easy. Temperature control of the evaluation unit 14 by means of the temperature control device 3 of the battery system 1 can be made particularly easy in this way.

Essentially, the sensor interface 30 has a first communication unit 31 and the control interface 40 has a second communication unit 41. Both communication units 30, 41 are configured as shown for transmitting and receiving light signals 60 into and from the temperature control fluid 6. The temperature control fluid 6 is preferably transparent for the light signals 60. Communication units 31, 41 can, for example, be equipped with LED elements for transmitting and/or photosensor elements for receiving light signals 60. To provide this, the sensor interface 30 also has a first arrangement section 32 to be able to arrange the first communication unit 31 inside the temperature control fluid line 4. Similarly, the control interface 40 has a second arrangement section 42 for allowing the second communication unit 41 also to be arranged inside the temperature control fluid line 4. Preferably, as illustrated, the first communication unit 31 of the sensor interface 30 is arranged at a first arrangement location 33 and the second communication unit 41 of the control interface 40 is arranged at a second arrangement location 43 such that the temperature control fluid line 41 between the first 33 and the second arrangement location 43 is straight or at least substantially straight. A weakening of the light signal 60 by corners, edges or bends of the temperature control fluid line 4 can thus be avoided. Furthermore, the temperature control fluid line 4 has an inner wall 5. Already the inner wall 5 itself can have two areas with different refractive indices to provide a total reflection, whereby the area with a higher refractive index is arranged radially further inside. Alternatively or additionally, a boundary layer between the inner wall 5 of the temperature control fluid line 4 and the temperature control fluid 6 can also be used to provide the total reflection, wherein in this configuration the temperature control fluid 6 has a greater refractive index than the inner wall 5 of the temperature control fluid line 4. Overall, a weakening of a signal strength of the light signal 60 can be avoided or at least significantly restricted by a total reflection. The first communication unit 31 of the sensor interface now transmits 30 light signals 60 to the, preferably transparent, temperature control fluid 6 in order to transmit the status data acquired by the sensor units 13 of the sensor device 11. These light signals 60 are transmitted in the temperature control fluid 6 and received by the second communication unit 41 of the control interface 40. In other words, in a battery system 1 according to the invention having a data recording device 10 according to the invention and thus a transmission device 20 according to the invention, the temperature control fluid line 4 and the temperature control fluid 6 respectively are used to transmit the light signals 60 containing the status data. Additional wires and/or cables for the transmission of status data can be avoided. Furthermore, the sensor interface 30 shown is connected to two sensor units 13 of the sensor device 11. In order to be able to assign the status data to the individual battery cells 2, for example, it can be provided that the first communication unit 31 is configured to modulate the emitted light signal 60 with regard to a frequency, a pulse width and/or an amplitude of the emitted light signal 60. It is also possible to digitize the status data and code the respective battery cell 2, for example in a head section of a data package. In this way, a large number of battery cells 2 can be identified with a single first communication unit 31.

Figure 2:
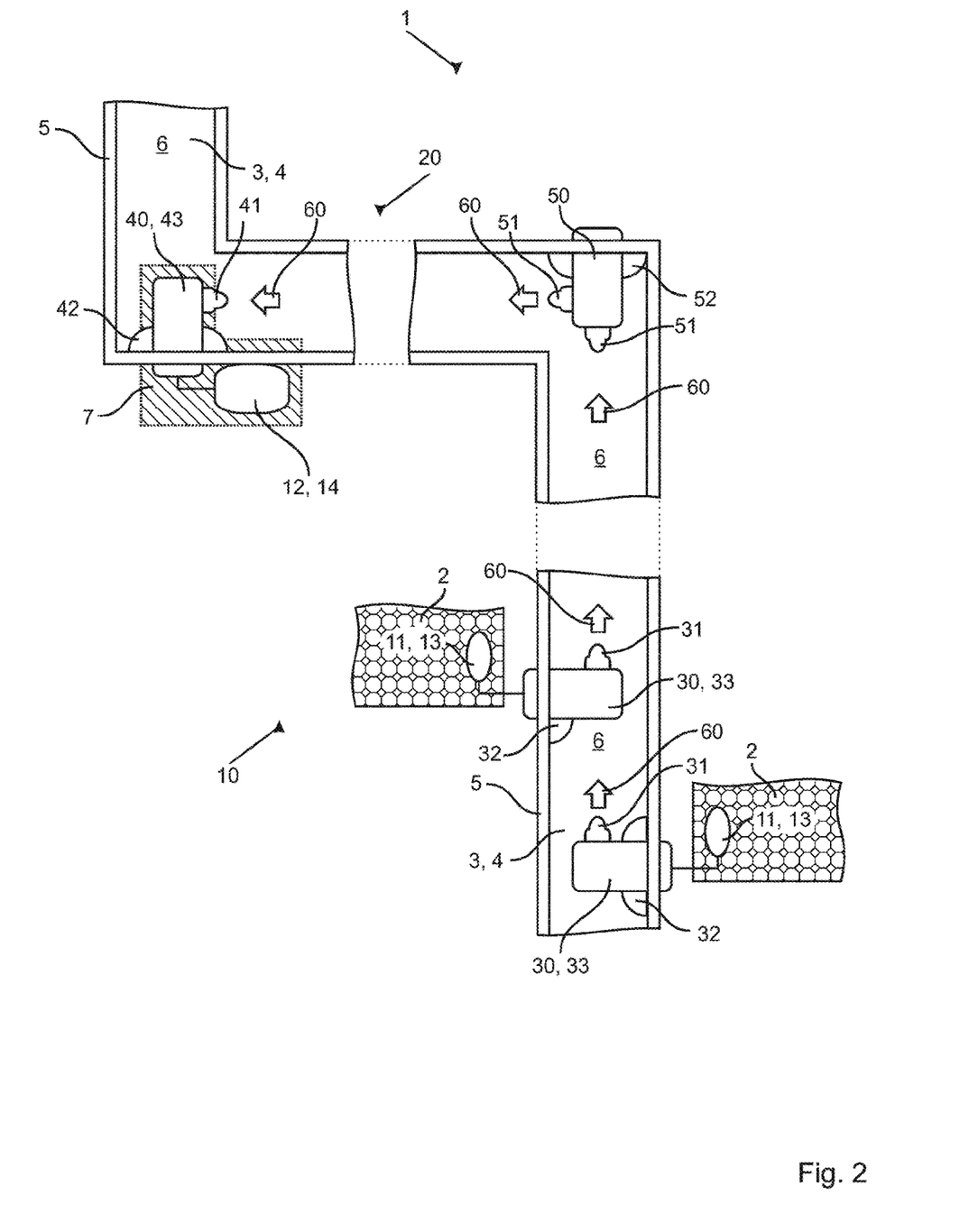
FIG. 2 A battery system according to the invention according to a second embodiment.

FIG. 2 shows a further version of a battery system according to the invention 1. The control interface 40 and its components as well as the control devices 12 and their components are structured analogously to the version shown in FIG. 1, so that reference is made to the description there. Two battery cells 2, each monitored by a sensor unit 13 of the sensor device 11, are also shown in the embodiment of a battery system 1 according to the invention shown in FIG. 2. In contrast to the embodiment variant shown in FIG. 1, a separate first communication unit 31 of a sensor interface 30 is provided for each of the sensor units 13. In this way it is also possible to differentiate between the respective battery cells 2, from which the status data were detected. The temperature control fluid line 4 in turn has an inner wall 5, which, alone or in combination with the temperature control fluid 6, is configured to produce a total reflection of the light signals 60. Even in this embodiment of an invented system consisting of a data recording device 10 and a temperature control device 3 of a battery system 1, a total reflection of the light signals 60 can prevent a reduction in the signal strength of the light signal 60. Further shown in the represented embodiment is an intermediate amplifier unit 50 comprising a third communication unit 51 which is also arranged inside the temperature control fluid line 4 by a third arrangement section 52. The third communication unit 51 is configured for sending and receiving light signals 60, so that light signals 60 can be forwarded, for example, from sensor interface 30 to control interface 40. Also the reverse data transfer, as it can occur for example with a bidirectional data transmission, can be provided by such an intermediate amplifier unit 50. In the embodiment shown, the intermediate amplifier unit 50 is arranged at a bend in the temperature control fluid line 4. Alternatively or additionally, such intermediate amplifier units 50 can also be arranged at positions within the temperature control fluid line 4 at which a drop in signal strength of the light signals 60 can already occur. By amplifying the light signal 60 inside the intermediate amplifier unit 50 and retransmitting the light signal 60, the range of the light signals 60 inside the temperature control fluid line 4 can be significantly increased. Almost any distance between the control interface 40 and the sensor interface 30 of a transmission device 20 according to the invention can be provided in this way.

The invention claimed is:

1. A transmission device for transmitting status data for a battery system having at least one battery cell and a temperature controlling device for temperature control of the at least one battery cell with a temperature controlling fluid guided at least in sections in a temperature controlling fluid line, the transmission device having a sensor interface for data-communicating connection to a sensor device for determining status data of the at least one battery cell, and a control interface for data-communicating connection to a control device for processing the status data, wherein the sensor interface has a first communication unit for emitting light signals into the temperature control fluid and a first arrangement section for arranging the first communication unit in the temperature control fluid line wherein the control interface comprises a second communication unit for receiving light signals from the temperature control fluid and a second arrangement section for arranging the second communication unit in the temperature control fluid line, and wherein, in an arranged status, light signals are emittable into the temperature control fluid by the first communication unit of the sensor interface for transmitting the status data, and are receivable from the temperature control fluid by the second communication unit of the control interface, wherein the transmission device comprises an intermediate amplifier unit having at least a third communication unit for transmitting and receiving light signals into the intermediate amplifier unit and from the temperature control fluid, respectively, and a third arrangement section for arranging the third communication unit in the temperature control fluid line, wherein in the arranged status light signals of at least the first communication unit or second communication unit are receivable from the temperature control fluid by the at least one third communication unit of the intermediate amplifier unit and are transmittable to at least the second communication unit or first communication unit into the temperature control fluid, wherein the third communication unit is arranged in the third arrangement section in the temperature control fluid line such that the temperature control fluid line between the first communication unit and the third communication unit is fluid communicating connected to the temperature control fluid line between the third communication unit and the second communication unit.

2. The transmission device according to claim 1, wherein the light signals are at least phase-synchronous or monochromatic.

3. The transmission device according to claim 1, wherein the first communication unit for receiving light signals from the temperature control fluid and the second communication unit for transmitting light signals into the temperature control fluid are configured to provide bidirectional transmission.

4. The transmission device according to claim 1, wherein at least the first or the second or the third communication unit have at least an LED element for emitting light signals or a photosensor element for receiving light signals.

5. A data recording device for recording status data of a battery system, the battery system having at least one battery cell and a temperature control device for controlling the temperature of the at least one battery cell with a temperature control fluid conducted at least in sections in a temperature control fluid line, the data recording device having a sensor device with at least one sensor unit for determining the status data of the at least one battery cell, a control device for processing the status data and a transmission device for transmitting the status data, wherein the transmission device is for transmitting status data for a battery system having at least one battery cell and a temperature controlling device for temperature control of the at least one battery cell with a temperature controlling fluid guided at least in sections in a temperature controlling fluid line, wherein the transmission device has a sensor interface for data-communicating connection to a sensor device for determining status data of the at least one battery cell, and a control interface for data-communicating connection to a control device for processing the status data, wherein the sensor interface has a first communication unit for emitting light signals into the temperature control fluid and a first arrangement section for arranging the first communication unit in the temperature control fluid line, wherein the control interface comprises a second communication unit for receiving light signals from the temperature control fluid and a second arrangement section for arranging the second communication unit in the temperature control fluid line, and wherein, in an arranged status, light signals are emittable into the temperature control fluid by the first communication unit of the sensor interface for transmitting the status data, and are receivable from the temperature control fluid by the second communication unit of the control interface, wherein the transmission device comprises an intermediate amplifier unit having at least a third communication unit for transmitting and receiving light signals into the intermediate amplifier unit and from the temperature control fluid, respectively, and a third arrangement section for arranging the third communication unit in the temperature control fluid line, wherein in the arranged status light signals of at least the first communication unit or second communication unit are receivable from the temperature control fluid by the at least one third communication unit of the intermediate amplifier unit and are transmittable to at least the second communication unit or first communication unit into the temperature control fluid, wherein the third communication unit is arranged in the third arrangement section in the temperature control fluid line such that the temperature control fluid line between the first communication unit and the third communication unit is fluid communicating connected to the temperature control fluid line between the third communication unit and the second communication unit.

6. The data recording device according to claim 5, wherein the control device has an evaluation unit for processing the status data, at least the evaluation unit and the second communication unit being arranged on a common board.

7. The data recording device according to claim 5, wherein the at least one sensor unit is configured to acquire at least one status data selected from the group consisting of: temperature, voltage, current, and leak.

8. The data recording device according to claim 5, wherein the sensor device comprises two or more sensor units for the recording of status data of two or more battery cells.

9. The data recording device according to claim 8, wherein, in order to distinguish the battery cells, the transmission device has at least one first communication unit for each associated battery cell, each of the first communication units being connected in a data-communicating manner via the sensor interface to the sensor unit which is associated with the respective battery cell.

10. The data recording device according to claim 8, wherein the first communication unit is configured for emitting light signals which are at least frequency-modulated, pulse-width-modulated or amplitude-modulated in order to distinguish the acquired battery cells.

11. The data recording device according to claim 8, wherein each of the at least two battery cells being associated with at least one sensor unit.

12. A system comprising a temperature control device and a data recording device for a battery system, the battery system having at least one battery cell, the temperature control device having a temperature control fluid which is conducted at least in sections in a temperature control fluid line for temperature control of the at least one battery cell, the data recording device having a sensor device for determining status data of the at least one battery cell, a control device for processing the status data and a transmission device for transmitting the status data, wherein the transmission device is for transmitting status data for a battery system having at least one battery cell and a temperature controlling device for temperature control of the at least one battery cell with a temperature controlling fluid guided at least in sections in a temperature controlling fluid line, the transmission device having a sensor interface for data-communicating connection to a sensor device for determining status data of the at least one battery cell, and a control interface for data-communicating connection to a control device for processing the status data, wherein the sensor interface has a first communication unit for emitting light signals into the temperature control fluid and a first arrangement section for arranging the first communication unit in the temperature control fluid line, wherein the control interface comprises a second communication unit for receiving light signals from the temperature control fluid and a second arrangement section for arranging the second communication unit in the temperature control fluid line, wherein, in an arranged status, light signals are emittable into the temperature control fluid by the first communication unit of the sensor interface for transmitting the status data, and are receivable from the temperature control fluid by the second communication unit of the control interface or the data recording device is for recording status data of a battery system, wherein the battery system has at least one battery cell and a temperature control device for controlling the temperature of the at least one battery cell with a temperature control fluid guided at least in sections in a temperature control fluid line, wherein the data recording device has a sensor device with at least one sensor unit for determining the status data of the at least one battery cell, a control device for processing the status data and a transmission device for transmitting the status data, wherein the transmission device is for transmitting status data for a battery system having at least one battery cell and a temperature controlling device for temperature control of the at least one battery cell with a temperature controlling fluid guided at least in sections in a temperature controlling fluid line, the transmission device having a sensor interface for data-communicating connection to a sensor device for determining status data of the at least one battery cell, and a control interface for data-communicating connection to a control device for processing the status data, wherein the sensor interface has a first communication unit for emitting light signals into the temperature control fluid and a first arrangement section for arranging the first communication unit in the temperature control fluid line, and the control interface comprises a second communication unit for receiving light signals from the temperature control fluid and a second arrangement section for arranging the second communication unit in the temperature control fluid line, and wherein, in the arranged status, light signals are emittable into the temperature control fluid by the first communication unit of the sensor interface for transmitting the status data, and are receivable from the temperature control fluid by the second communication unit of the control interface, wherein the transmission device comprises an intermediate amplifier unit having at least a third communication unit for transmitting and receiving light signals into the intermediate amplifier unit and from the temperature control fluid, respectively, and a third arrangement section for arranging the third communication unit in the temperature control fluid line, wherein in the arranged status light signals of at least the first communication unit or second communication unit are receivable from the temperature control fluid by the at least one third communication unit of the intermediate amplifier unit and are transmittable to at least the second communication unit or first communication unit into the temperature control fluid, wherein the third communication unit is arranged in the third arrangement section in the temperature control fluid line such that the temperature control fluid line between the first communication unit and the third communication unit is fluid communicating connected to the temperature control fluid line between the third communication unit and the second communication unit.

13. The system according to claim 12, wherein, in order to provide a total reflection of the light signals, at least the temperature control fluid line has an inner wall with at least two different refractive indices, or in that the temperature control fluid line has an inner wall, the inner wall and the temperature control fluid having two different refractive indices.

14. The system according to claim 12, wherein the temperature control fluid line between a first arrangement location of the first communication unit and a second arrangement location of the second communication unit is straight.

15. A method for transmitting status data of a battery cell in a battery system according to claim 13, wherein the status data are transmitted at least in sections as light signals in the temperature control fluid.

16. A battery system comprising at least one battery cell and a system comprising a temperature control device and a data recording device for a battery system, wherein the system comprises a temperature control device and a data recording device for a battery system, the battery system having at least one battery cell, the temperature control device having a temperature control fluid which is conducted at least in sections in a temperature control fluid line for temperature control of the at least one battery cell, the data recording device having a sensor device for determining status data of the at least one battery cell, a control device for processing the status data and a transmission device for transmitting the status data, wherein the transmission device is for transmitting status data for a battery system having at least one battery cell and a temperature controlling device for temperature control of the at least one battery cell with a temperature controlling fluid guided at least in sections in a temperature controlling fluid line, the transmission device having a sensor interface for data-communicating connection to a sensor device for determining status data of the at least one battery cell, and a control interface for data-communicating connection to a control device for processing the status data, wherein the sensor interface has a first communication unit for emitting light signals into the temperature control fluid and a first arrangement section for arranging the first communication unit in the temperature control fluid line, wherein the control interface comprises a second communication unit for receiving light signals from the temperature control fluid and a second arrangement section for arranging the second communication unit in the temperature control fluid line, wherein, in an arranged status, light signals are emittable into the temperature control fluid by the first communication unit of the sensor interface for transmitting the status data, and are receivable from the temperature control fluid by the second communication unit of the control interface or the data recording device is for recording status data of a battery system, the battery system having at least one battery cell and a temperature control device for controlling the temperature of the at least one battery cell with a temperature control fluid guided at least in sections in a temperature control fluid line, wherein the data recording device has a sensor device with at least one sensor unit for determining the status data of the at least one battery cell and a control device for processing the status data and a transmission device for transmitting the status data, wherein the transmission device is for transmitting status data for a battery system having at least one battery cell and a temperature controlling device for temperature control of the at least one battery cell with a temperature controlling fluid guided at least in sections in a temperature controlling fluid line, wherein the transmission device has a sensor interface for data-communicating connection to a sensor device for determining status data of the at least one battery cell, and a control interface for data-communicating connection to a control device for processing the status data, wherein the sensor interface has a first communication unit for emitting light signals into the temperature control fluid and a first arrangement section for arranging the first communication unit in the temperature control fluid line, and the control interface comprises a second communication unit for receiving light signals from the temperature control fluid and a second arrangement section for arranging the second communication unit in the temperature control fluid conduit, and wherein, in the arranged status, light signals are emittable into the temperature control fluid by the first communication unit of the sensor interface for transmitting the status data, and are receivable from the temperature control fluid by the second communication unit of the control interface, wherein the transmission device comprises an intermediate amplifier unit having at least a third communication unit for transmitting and receiving light signals into the intermediate amplifier unit and from the temperature control fluid, respectively, and a third arrangement section for arranging the third communication unit in the temperature control fluid line, wherein in the arranged status light signals of at least the first communication unit or second communication unit are receivable from the temperature control fluid by the at least one third communication unit of the intermediate amplifier unit and are transmittable to at least the second communication unit or first communication unit into the temperature control fluid, wherein the third communication unit is arranged in the third arrangement section in the temperature control fluid line such that the temperature control fluid line between the first communication unit and the third communication unit is fluid communicating connected to the temperature control fluid line between the third communication unit and the second communication unit.

\* \* \* \* \*